United States Patent

[11] 3,605,090

[72] Inventor Herbert O. Burton
Little Silver, N.J.
[21] Appl. No. 816,605
[22] Filed Apr. 16, 1969
[45] Patented Sept. 14, 1971
[73] Assignee Bell Telephone Laboratories Incorporated
Murray Hill, N.J.

[54] DECODER FOR CONVOLUTIONAL SELF-ORTHOGONAL ERROR-CORRECTING CODES
5 Claims, 1 Drawing Fig.

[52] U.S. Cl. .......... 340/146.1
[51] Int. Cl. .......... G06f 11/12, G08c 25/00
[50] Field of Search .......... 340/146.1; 235/153; 307/208

[56] References Cited

UNITED STATES PATENTS

| | | | |
|---|---|---|---|
| 3,227,999 | 1/1966 | Hagelbarger | 340/146.1 |
| 3,303,333 | 2/1967 | Massey | 340/146.1 X |
| 3,469,236 | 9/1969 | Gallager | 340/146. 1 |
| 3,475,724 | 10/1969 | Townsend, et al. | 340/146.1 |
| 3,299,285 | 1/1967 | Cannon | 307/208 |

*Primary Examiner*—Eugene G. Botz
*Assistant Examiner*—Charles E. Atkinson
*Attorneys*—R. J. Guenther and Kenneth B. Hamlin

ABSTRACT: An error-correcting decoder for convolutional self-orthogonal codes includes a multistage syndrome register. A majority logic circuit is connected to selected stages of the register. If, during the decoding process, the logic circuit senses that a majority of the selected stages contain "1" signals, the circuit generates a correction signal that is utilized to invert the information digit currently being processed. Circuitry is provided responsive to such a correction signal for resetting to "0" all the selected stages of the syndrome register. In this way the undesirable error propagation characteristic of a conventional feedback decoder is significantly improved.

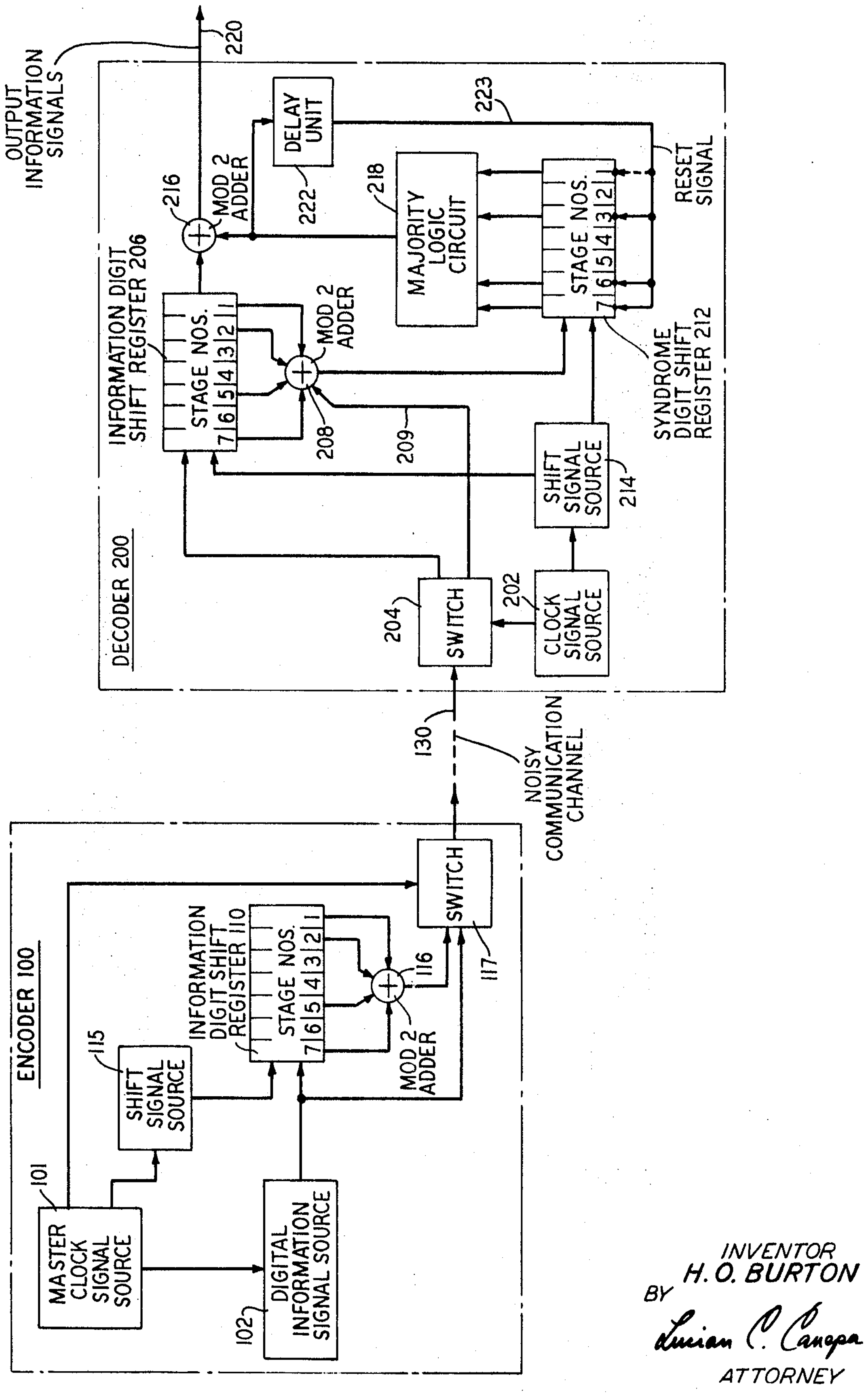
INVENTOR
H. O. BURTON
BY *Lucian C. Canepa*
ATTORNEY

DECODER FOR CONVOLUTIONAL SELF-ORTHOGONAL ERROR-CORRECTING CODES

BACKGROUND OF THE INVENTION

1. Field of the Invention

This invention relates to the decoding of redundant signal sequences and more particularly to an error-correcting decoder for such sequences.

2. Description of the Prior Art

Two systematic procedures are known for decoding a redundant sequence that includes information signals encoded in accordance with a convolutional self-orthogonal code. One of these procedures, called definite decoding, is embodied in the error-correcting system depicted in FIG. 1 of D. W. Hagelbarger U.S. Pat. No. 3,227,999, issued Jan. 4, 1966. In accordance with the procedure embodied in the FIG. 1 system, each decoding correction made with respect to an information signal is purposely not taken advantage of to change the nature of a stored syndrome or error pattern representation. If such a change were made, the decoding of subsequently processed information signals would be directly influenced.

In other words, in definite decoding there is no feedback connection in the decoding circuitry. Hence, an erroneous decision by the decoder cannot lead to other faulty decisions in subsequent processing. In effect a positive immunity against error propagation in the decoding process is thereby achieved (but at the expense of reduced error-correcting capabilities).

The other available procedure for processing convolutional self-orthogonal codes is known as feedback decoding. In this type of decoding each correction achieved in the decoding operation affects subsequent decoding decisions. This is accomplished by respectively inverting all the syndrome signals that indicate that the information signal currently being processed should be corrected (inverted). FIG. 12.7 on page 388 of *Principles of Data Communication* by R. W. Lucky, J. Salz and E. J. Weldon, Jr., McGraw-Hill, 1968, illustrates this type of decoding procedure.

It is apparent that in a feedback decoder a bad decoding decision can introduce additional errors in the decoding process. However, despite this error propagation possibility, feedback decoders are advantageous in that they exhibit relatively powerful error-correcting capabilities.

SUMMARY OF THE INVENTION

An object of the present invention is an improved decoder.

More specifically, an object of this invention is an improved decoder capable of processing convolutional self-orthogonal codes.

Another object of the present invention is a simple feedback-type decoding arrangement which has greater error-correcting capabilities than a definite decoder but which exhibits considerably less of an error propagation problem than a conventional feedback decoder.

These and other objects of the present invention are realized in a specific illustrative embodiment thereof that comprises a decoder for convolutional self-orthogonal codes. Included in the decoder is a multistage syndrome register. A majority logic circuit is connected to selected stages of the register. If, during the decoding process, the logic circuit senses that a majority of the selected stages contain "1" signals, the circuit generates a correction signal that is utilized to correct (invert) the information digit currently being processed. Circuitry is provided responsive to such a correction signal for clearing all the selected stages of the register. In accordance with this decoding configuration, a relatively powerful error-correcting capability with limited error propagation is achieved.

It is a feature of the present invention that in a decoder for convolutional self-orthogonal codes feedback circuitry be provided responsive to the generation of a correction signal by a majority logic circuit for resetting selected stages of a syndrome register.

BRIEF DESCRIPTION OF THE DRAWING

A complete understanding of the present invention and of the above and other objects, features and advantages thereof may be gained from a consideration of the following detailed description of a specific illustrative embodiment thereof presented hereinbelow in connection with the accompanying single-FIGURE drawing which shows a particular illustrative error-correcting system that embodies the principles of this invention.

DETAILED DESCRIPTION

The system shown in the drawing includes a conventional encoder 100 for encoding recurrent digital information signal sequences supplied by the source 102. For illustrative purposes the encoding of the information signals is assumed to take place in accordance with a rate one-half double-error-correcting convolutional self-orthogonal code. Such a code is well known in the art, being described, for example, in the aforecited Hagelbarger patent.

The encoder 100 shown in the drawing includes a master clock signal source 101, a shift signal source 115, an information digit shift register 110, a modulo two adder (an exclusive-OR circuit) 116 and a switch 117. These units may be identical in configuration to the correspondingly numbered blocks shown in FIG. 1 of the Hagelbarger patent. Moreover, the mode of operation of the encoder 100 is straightforward and evident from the description contained in the Hagelbarger patent relative to FIG. 1 thereof.

Interleaved information and parity check signals generated by the encoder 100 are propagated via a noisy communication channel 130 to a specific illustrative decoder 200 made in accordance with the principles of the present invention. Under the control of clock signals supplied by a source 202, a switch 204 functions to separate the interleaved information and check signals by routing each received information digit to a shift register 206 and by routing each received check signal to a modulo two adder 208.

In effect, the modulo two adder 208 recalculates a set of parity check signals from the received information signals. Each such recalculated check signal is compared (in the adder 208) with it corresponding received check signal which appears on the line 209. If no errors occurred in the depicted system, the recalculated and received check signals will be identical and for each such corresponding pair of signals, the output of the adder 208 will be a "0" signal. On the other hand, error occurrences can cause the recalculated and received check signals to differ which in turn causes the adder 208 to provide a "1" output signal.

In a manner well known in the art (see, for example, the Hagelbarger patent), the sequence of signals provided by the adder 208 is applied to and serially shifted through the stages of a syndrome digit shift register 212. (Shifting of the register 212, as well of the register 206, is controlled by a shift signal source 214.) It is manifest that the digit pattern stored in the register 212 constitutes an error representation. Thus, for example, if no errors occur in the system, it is evident that an all-"0 sequence is stored in the register 212.

Interpretation of the error pattern stored in he register 212 to determine the correctness or not of the information signal currently being outputted from stage No. 1 of the information digit register 206 to a modulo two adder 216 is carried out by a majority logic circuit 218. As described in the Hagelbarger patent, the circuit 218 provides a "1" output signal if a majority of the syndrome digits stored in selected stages of the register 212 are "1" signals. Such a "1" correction signal provided by the circuit 218 is applied to the modulo two adder 216 and serves to invert or reverse the information signal being propagated through the adder 216 at that time. In turn the corrected information signal appears at the output of the adders 216 on the output line 220 of the decoder. Of course, if a correction signal is not provided by the logic circuit 218; the information signal currently being processed is transmitted through the adder or reversing circuit 216 in unaltered form.

The theory underlying the above-outlined majority logic-decoding operation, and the procedure to follow in determining which stages of the syndrome register 212 are to be sensed by the circuit 218 for a particular convolutional self-orthogonal code, are well known in the art. The applicable theory and procedure are described in the aforecited Hagelbarger and Lucky et al. references, in *Threshold Decoding* by J. L. Massey, MIT Press, 1963 and in an article by Robinson and Bernstein cited below.

Hagelbarger's FIG. 1 system includes a majority logic circuit whose output is not coupled back to alter any of the representations stored in the associated syndrome register. Such a decoding approach is designated by Lucky et al. as definite decoding.

Lucky et al. also describe the technique of applying the output of the majority logic circuit to those selected stages of the syndrome register which supply inputs to the logic circuit. In accordance with that technique, a "1" output signal provided by the logic circuit is utilized to respectively invert the representations stored in the selected syndrome stages. This technique is referred to as feedback decoding.

A decoding error, caused, for example, by an error occurrence that is outside the error-correcting capability of a particular convolutional self-orthogonal code, can cause an erroneous "1" correction signal to be generated. In definite decoding, where no feedback of the correction signal occurs, such an error does not tend to cause a succession of further decoding errors. In conventional feedback decoding, on the other hand, the erroneous correction signal is utilized to change selected ones of the syndrome representations and, as a result, a succession of further decoding errors can thereby result. This phenomenon of a decoding error tending to trigger other decoding errors is known as the propagation effect or decoding error propagation and is a well-known characteristic of feedback decoders for convolutional self-orthogonal codes.

Even in the conventional feedback decoder for convolutional self-orthogonal codes, however, there is a definable limit on the extent to which a decoding error will propagate. In "A Class of Binary Recurrent Codes with Limited Error Propagation" by J. P. Robinson and A. J. Bernstein, *IEEE Transactions on Information Theory*, Vol. IT-13, No. 1, Jan. 1967, pp. 106-113, it is shown that if a decoding error in a feedback decoder is followed by an error-free interval of several constraint lengths, no additional error beyond this interval will be made.

In particular, Robinson and Bernstein derive the following bound on the error propagation length L for a conventional feedback decoder.

$$L \leq (n_A - b)t + 2n_A$$

where $n_A$ = actual constraint length (as defined by Robinson and Bernstein).

$b$ = basic block length of the convolutional self-orthogonal code, i.e., the number of digits containing one information group and one check group; for a rate one-half code $b$=2.

$e$ = the number of errors the code is guaranteed to correct.

$t$ = the least integer satisfying $$\left[\frac{T+1}{2}\right]+\left[\frac{2T-J}{2}\right] \geq [N-J+T-1]\left[\frac{J-T}{T}\right]^t$$

$T$ = the threshold value (usually $e$+1 when the code has minimum distance $2e+1$).

$J$ = the number of syndrome digits used in decoding each information digit.

$N = n_A/b$.

In accordance with the principles of the present invention, a modified feedback decoder for convolutional self-orthogonal codes has been devised. The modification is based on the realization that error propagation in the decoding process will end as soon as there are $e$ or fewer "1's" in the syndrome representation. Thus, an approach to decoding which causes a relatively fast decrease in the number of "1's" in the syndrome representation will result in relatively short error propagation lengths. This is accomplished in accordance with the present invention by resetting or clearing to "0" (not respectively inverting) all the selected stages of the syndrome register 212 shown in the drawing. The syndrome stages that store "0" signals are left unchanged, but those that store "1's" are each cleared to "0." In effect this unique feedback-decoding technique hedges against a possibly incorrect decoding decision by putting more emphasis on those syndrome signals that indicated positively that an error has occurred and by putting less emphasis on the syndrome signals that indicated negatively with respect to the occurrence of an error. In accordance with this approach, new "1" signals are never introduced into the syndrome representation by the decoder itself. Accordingly, if no more errors occur, the syndrome register will return within two constraint lengths to the condition in which $e$ or fewer "1's" are stored therein. This bound on error propagation is considerably better than the one reported by Robinson and Bernstein.

However, there is a penalty in error-correcting capability associated with a modified feedback decoder made in accordance with the principles of this invention. More specifically, suppose a self-orthogonal code has been designed to correct $e$ errors and that the actual constraint length (as defined by Robinson and Bernstein) is $n_A$ bits. Then 1. With conventional feedback decoding, the decoder will correct every error pattern for which no more than $e$ errors occur in any $n_A$ consecutive bits. Such a decoder will also correct some but not all patterns which contain more than $e$ errors in $n_A$ bits.
2. With conventional definite decoding, the decoder will correct every error pattern for which no more than $e$ errors occur in any $2n_A-b$ consecutive bits. Such a decoder will correct some but not all patterns which contain more than $e$ errors in $2n_A-b$ bits.
3. With modified feedback decoding in accordance with the principles of the present invention, the error-correcting capability of the decoder is between that of feedback and definite decoding. Some errors that would not be corrected by definite decoding are corrected with modified feedback decoding and, on the other hand, some errors that would be corrected by feedback decoding are not corrected with modified feedback decoding.

Returning to the specific illustrative embodiment shown in the drawing, it is seen that the output of the majority logic circuit 218 is applied via a delay unit 222 to the third, sixth and seventh stages of the syndrome register 212. The unit 222 is included in the decoder to prevent the occurrence of a race condition in the depicted circuitry. The delay thereof is made sufficiently short that the operation of resetting or clearing the indicated stages to "0" occurs before the representation stored in the register 212 is next shifted one stage to the right by the shift source 214.

The majority logic circuit 218 shown in the drawing is connected to respond to the syndrome representations stored in the first, third, sixth and seventh stages of the register 212. Nevertheless, the aforementioned reset or feedback signal need not actually be applied to the first stage of the register 212. This is so because the syndrome representation stored in stage No. 1 is during the next shifting interval propagated out of the register 212. Thus, due to the shifting action of the syndrome register, the representation formerly stored in stage No. 1 is not included in the next set of syndrome digits sensed by the circuit 218. Hence, resetting that stage to "0" is unnecessary.

As indicated, stage No. 1 of the particular illustrative syndrome register 212 shown in the drawing need not as a practical matter actually be reset to "0". The dashed line extending between the reset signal line 223 and stage No. 1 is intended to signify that a direct electrical connection therebetween is accordingly not necessary. At the same time the dashed line is symbolic of the fact that in a decoder in which the rightmost stage of the syndrome register does not constitute one of the selected stages, every one of the selected stages is actually cleared to or maintained at "0" by applying a reset signal thereto.

Illustratively each of the stages included in the syndrome register 212 comprises a bistable multivibrator unit that includes a reset terminal. Such units are relatively simple and various economical versions thereof are well known in the art. By contrast, the conventional feedback decoder shown in FIG. 12.7 on page 388 of the Lucky et al. reference requires that a plurality of exclusive-OR circuits be associated with a syndrome register to accomplish the desired inverting operation. Alternatively each syndrome stage of a conventional feedback decoder could comprise a complementary-type bistable circuit, but even such circuits are typically more complex than the simple set—reset units that are included in the novel herein-described decoder.

For the particular double-error-correcting code embodied in the illustrative modified feedback system shown in the drawing, the bound on error propagation is 26 digits and the constraint length is 14 digits. By contrast, the error propagation bound and the constraint length for a conventional feedback decoder are 28 and 14, respectively.

The protection against error propagation provided by a modified feedback decoder made in accordance with the principles of the present invention is considerably more significant when more powerful or higher-rate convolutional self-orthogonal codes are employed. (To embody such alternative codes in a system of the type shown in the drawing is a straightforward matter. A rate one-half double-error-correcting code is embodied in the depicted system for reasons of simplicity and clarity of presentation only.) Thus, for example, if the principles of the invention are embodied in a quadruple-error-correcting system, for which $J$=8, the following tabular comparison emphasizes the advantage of the modified feedback technique:

TABLE I

| $b$ | $n_A$ | $t$ | L | $2n_A-b$ | $L-2n_A+b$ | Rate |
|---|---|---|---|---|---|---|
| 2 | 72 | 2 | 284 | 142 | 142 | 1/2 |
| 3 | 237 | 4 | 1,410 | 471 | 939 | 2/3 |
| 4 | 512 | 5 | 3,564 | 1,020 | 2,544 | 3/4 |
| 5 | 895 | | 6,240 | 1,785 | 4,455 | 4/5 |

In Table 1, $b$, $n_A$, $t$ and $L$ are as defined earlier above. The column headed $2n_A-b$ lists the error propagation bounds for modified feedback decoding systems made in accordance with the present invention. The column headed $L-2n_A+b$ lists the differences between those bounds and the corresponding Robinson–Bernstein bounds for conventional feedback systems. It is apparent that these differences attain significant magnitudes.

The more advantageous error propagation bounds of modified feedback decoders are illustrated above. Although, as previously indicated, such decoders are also characterized by less powerful error-correcting capabilities than conventional feedback systems, it is emphasized that the capabilities of the modified systems are greater than those of definite decoders. As is evident from the description above of the nature of the modified feedback circuitry, this greater capability over definite decoding is achieved at the expense of very little additional circuitry.

The relative error-correcting capabilities of definite, feedback and modified feedback decoding have been investigated. One such investigation has been carried out for a rate of two-thirds double-error-correcting code of the convolutional self-orthogonal type. In particular, for this code the number of three- and four-error patterns that could be corrected by each of these decoding techniques was evaluated. The results of this evaluation are set forth below:

TABLE II

| Error Pattern this Type of Decoding Weight | % of the Error Patterns Correctable Definite | Modified Feedback | Feedback |
|---|---|---|---|
| 3 | 41 | 56 | 64 |
| 4 | 11 | 21 | 28 |

As indicated in Table II, a modified feedback decoder made in accordance with the principles of the present invention exhibits better error-correcting properties than a conventional definite decoder.

It is to be understood that the above-described arrangement is only illustrative of the application of the principles of the present invention. In accordance with these principles numerous other arrangements may be devised by those skilled in the art without departing from the spirit and scope of the invention. For example, although emphasis has been directed herein to binary coding techniques the principles of this invention may be extended to nonbinary coding arrangements.

1. What is claimed is:

1. In combination in a decoder for convolutional self-orthogonal codes,
   - a multistage syndrome register,
   - a majority logic circuit responsive to the representations stored in selected stages of said register for generating correction signal for an information digit currently being processed, and
   - means responsive to the generation of said correction signal for setting each of said selected stages to a predetermined logical state corresponding to common reference state, those of said selected stages in said common reference state at said time said correction signal is generated remaining in said common reference state.

2. A combination as in claim 1 wherein said majority logic circuit includes an output terminal, wherein each of said syndrome register stages includes a reset terminal, and wherein said resetting means comprises a delay unit connected between said output terminal and each of said reset terminals.

3. In combination in a decoder for convolutional self-orthogonal codes,
   - a multistage syndrome register for storing a pattern of digits representative of the error status of received information digits,
   - means for shifting said pattern through said register in a digit-by-digit manner,
   - logic means connected to a selected plurality of the stages of said register for generating a "1" correction signal if a majority of said selected stages store "1" representations therein, and
   - resetting means responsive to said "1" correction signal for clearing to "0" each of said selected stages that stores a "1" representation and for maintaining in its "0" state each of said selected stages that stores a "0" representation.

4. A combination as in claim 3 wherein said resetting means includes means for preventing a race condition in said decoder while at the same time ensuring that resetting of said selected stages takes place before said register is next shifted.

5. A combination as in claim 4 wherein said register comprises seven stages, the selected stages of which are the first, third, sixth and seventh stages thereof, wherein said resetting means is connected to the third, sixth and seventh stages, and wherein said preventing means comprises a delay unit.